Sept. 16, 1958  A. L. GAUDIN  2,851,785
INCLINOMETER
Filed Nov. 8, 1956  2 Sheets-Sheet 1
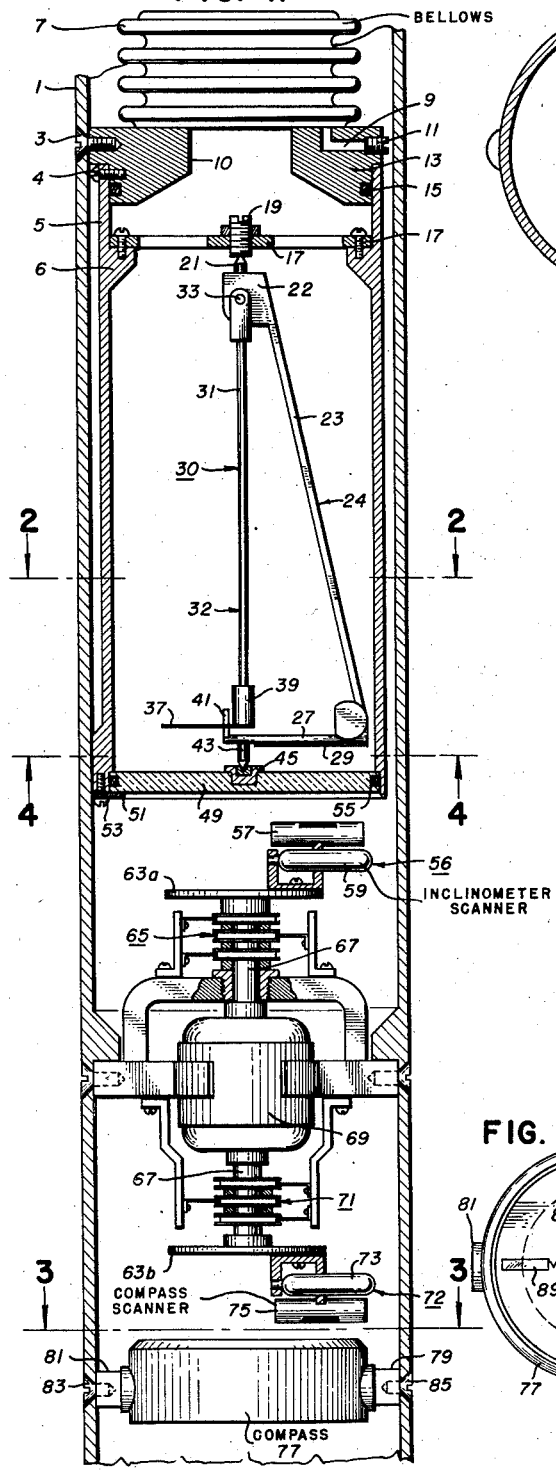
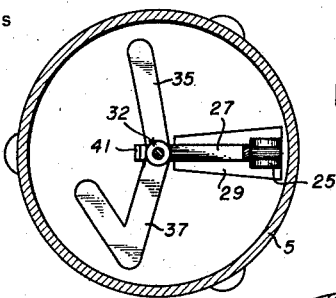
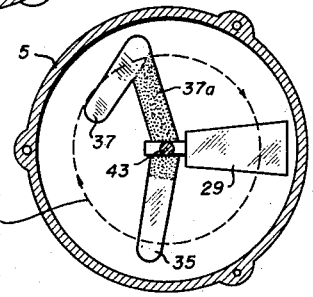
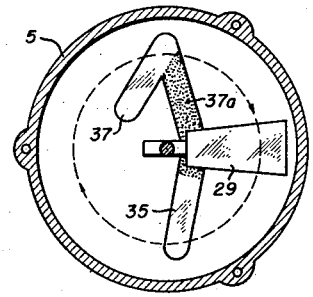
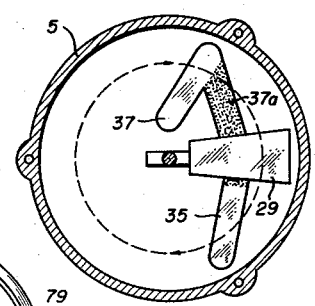
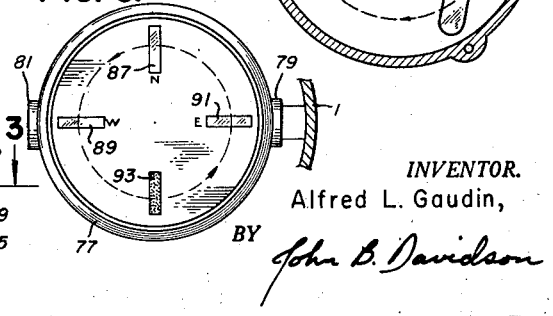
INVENTOR.
Alfred L. Gaudin,
BY John B. Davidson
ATTORNEY.

United States Patent Office 2,851,785
Patented Sept. 16, 1958

2,851,785
INCLINOMETER

Alfred L. Gaudin, Houston, Tex., assignor, by mesne assignments, to Jersey Production Research Company Application November 8, 1956, Serial No. 621,055

5 Claims. (Cl. 33—205)

The present invention relates to devices for determining the extent of inclination of an object from a vertical position and, more particularly, to apparatus for obtaining information at the earth's surface for determining the inclination of a well logging instrument or similar device while the device is in a well bore within the earth.

In the drilling of oil wells it is often desirable to determine accurately the inclination with respect to the vertical of a well bore that has been drilled in the earth. This is particularly true in connection with instruments for measuring the dip of the lithological strata within the earth wherein the instrument measures the angle at which the strata strike the bore. Further, it quite often becomes desirable to divert the drill purposefully away from the vertical position when measurements have indicated the presence of oil-bearing strata in a direction away from the vertical.

A device that has found wide acceptance by the industry is described in U. S. Patent No. 2,718,707 to Karl O. Heintz et al. While the device described by this patent has been found to be eminently satisfactory for the purposes for which it was designed, it has been found to suffer from a number of shortcomings. The device requires a number of ball bearing races for supporting one of the pendulous means required thereby. In spite of all precautions that may be taken, it has been found that dirt and other foreign substances will find their way into the ball bearing races to such an extent that in time the instrument will fail to perform its desired function. Even more serious is the change in calibration of the inclination-magnitude sensing portion of the device with changes in temperature that are inevitably encountered as the device is lowered into a well bore. The device requires a spiral spring to provide a biasing force against the inclination-magnitude sensing pendulum thereof which spring undergoes considerable distortion with temperature changes. Additionally, the inclinometer described in the Heintz et al. patent is quite heavy and bulky and can cause considerable damage to the bearings in the event of a suddent change in the speed of the apparatus lowering the inclinometer into the borehole.

The Heintz et al. inclinometer, in common with practically all inclinometers known to the prior art, also suffers from the disadvantage of being able to accurately measure inclination over only high angles of inclination or low angles of inclination but not at both high and low angles of inclination. In other words, the sensitivity of the instrument varies considerably with changes in the magnitude of inclination.

Accordingly, one object of the present invention is to provide a simple, rugged inclinometer that is easy to assemble and disassemble and that will present a minimum of maintenance difficulties. Another object is to provide an inclinometer that is essentially temperature insensitive. Still another object is to provide an inclinometer suitable for use in boreholes that is light in weight, of small size, and that will afford a high degree of accuracy in measurement of magnitude and sense of inclination. Yet another object is to provide an inclinometer that effects high measurement sensitivity at both high and low angles of inclination.

As one feature of the present invention, an eccentric body is mounted within the inclinometer casing and pivoted on the normally vertical axis of the casing so as to be free to turn only in the normally horizontal plane of the casing, i. e., the plane perpendicular to the normally vertical axis aforementioned and intersecting with the axis at a single point. This pendulous body is preferably supported between two substantially point bearings located as accurately as possible on said vertical axis. A second pendulum is hingedly mounted on the first pendulum so as to pivot about a point located as accurately as possible on the said vertical axis. The second pendulum should be free to swing in a plane including the said vertical axis of the casing and the center of gravity of the first pendulum. Thus, when the instrument is inclined from the vertical, the first pendulum will swing through some angle toward the direction of inclination and will come to rest pointing in that direction. The second pendulum will swing with the first pendulum and also will pivot until it again assumes a vertical position. The angle through which the first pendulum swings provides a measure of the direction of inclination and the angle assumed by the second pendulum with respect to the normally vertical axis of the casing provides a measure of the angle of inclination of the instrument.

Another feature of the invention lies in the apparatus for measuring the angle through which the two above-mentioned pendulums rotate upon inclination of the instrument from the vertical. A photo-electric scanner similar to the one described in the aforementioned patent to Heintz et al. is utilized to cyclically detect the positions of reflecting surface means attached to the first relatively horizontal swinging pendulum and to the second substantially vertically swinging pendulum. The scanner emits a directional beam of radiation such as light, and rotates at a constant speed and at a constant distance from the above-mentioned normally vertical axis of the casing so that the reflecting surface means reflect radiation from the source to a detector rotating with the source. The reflecting surface means attached to the second pendulum is shaped so that the angle between the leading edge thereof at the intersection with the path of the scanner and the tangent to the circular path of the scanner at that point is always less than a given angle. By this means, a change in the angle through which the scanner turns between the instant at which its detects the leading edge of the reflecting surface means attached to the first pendulum and the leading edge of the reflecting surface means attached to the second pendulum with a given change in amount of inclination of the instrument is made large enough to be accurately measurable at all angles of inclination for which the instrument may be designed.

According to a preferred embodiment of the invention, the reflecting surface means attached to the second pendulum comprises two surfaces, one of which provides large changes in the aforementioned angle through which the scanner turns for measuring inclinations of small magnitude, and the other surface provides large changes in the angle through which the scanner turns for the purpose of measuring inclinations of larger magnitude.

Other objects and features of this invention will become apparent upon consideration of the following description thereof when taken in connection with the accompanying drawings wherein:

Fig. 1 is an elevation view partially in cross-section of a preferred embodiment of the invention;

Fig. 2 is a top view partially in cross-section taken along the section 2—2 of the embodiment of the invention shown in Fig. 1;

Fig. 3 is a fragmentary sectional view taken along section 3—3 of the instrument shown in Fig. 1;

Figure 7:
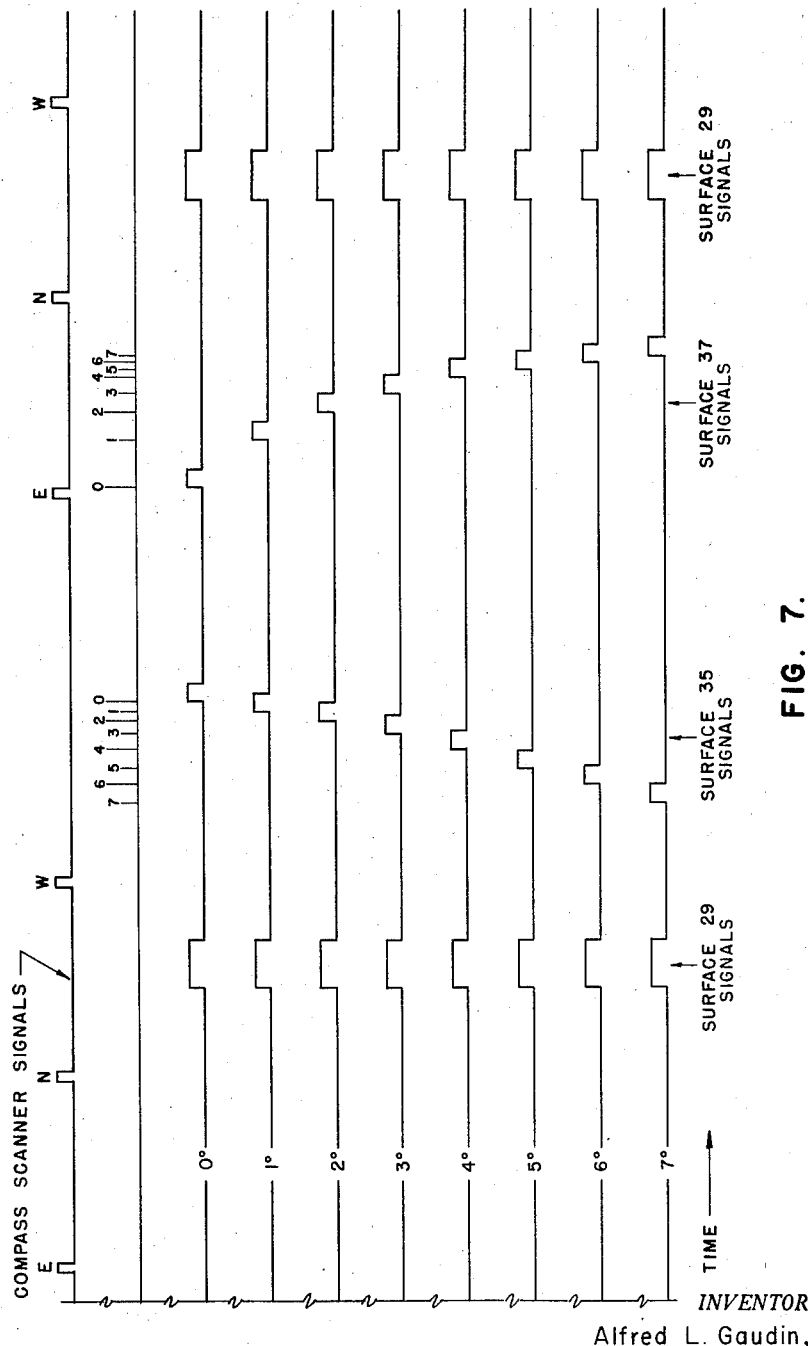

Figs. 4, 5 and 6 are views looking upwardly taken along the section 4—4 of the instrument shown in Fig. 1 for the purpose of illustrating the movement of the pendulum with relation to the circular path of the scanner for varying degrees of inclination of the instrument; and Fig. 7 presents wave form representations of signals derived by means of the instrument shown in Fig. 1 which are shown for the purpose of facilitating an understanding of the operation of the instrument.

With reference now to the embodiment of the invention shown in Fig. 1, reference numeral 1 represents the outer shell of the sonde within which the apparatus to be described is housed. Affixed to outer shell 1 by means of a plurality of screws, one of which is designated by reference numeral 3, is the casing of the inclinometer including cylindrical casing member 5 and bellows support member 13. The bellows support member is affixed to casing 5 by means of a plurality of small bolts, one of which is designated by reference numeral 4. The casing 5 and the bellows support member may be formed of stainless steel. The bellows support member has a central bore 10 for the purpose of providing fluid communication between the bellows 7 attached to the top thereof and the interior of casing 5. For the purpose of filling the bellows and the interior of the instrument with damping fluid, there is provided a filling hole 9 which is drilled within the bellows support member 13 and screw-threaded for insertion of a plug 11. An O-ring 15, preferably of neoprene or similar oil resistant material, provides a fluid-tight seal between the interior of casing 5 and the exterior of bellows support member 13. For the purpose of providing a support for top plate 17, an annular shoulder 6 is provided on the interior of casing 5. The function of top plate 17 is to provide a top support for the pendulous members to be described. Top plate 17 may be secured to annular shoulder 6 by means of a plurality of small bolts as shown. At the bottom end of cylindrical casing 5 there is provided a glass plate 49 held in place within a notch cut in the bottom end of the casing by means of a plurality of holding members, such as that designated by reference numeral 51, attached to the casing by means of a plurality of set screws such as designated by reference numeral 53. If convenient, the single glass plate shown may be replaced by a pair of transparent plates of glass or other suitable material separated by spacing means. An O-ring 55 provides a fluid seal between the inner surface of casing 5 and the glass plate.

Pendulous member assembly 30 comprises a first pendulum 24 including a pivot arm 23 suspended between an adjustable bearing 19 screw-threaded through top plate 17 and a fixed bearing 45 set within glass plate 49. Bearing 21, which fits into bearing support member 19, and bearing 43, which fits into bearing support member 45, each provide a substantially point-bearing surface so that bearing friction is minimized. The bearing support members 19 and 45 preferably are positioned so that the axis of rotation of pendulous member 24 is on or substantially parallel to the longitudinal axis of casing member 5.

Hingedly affixed to top block 22 of pivot arm 23 by means of rod 33 is a second pendulum 32 including shaft 31, weight 39 and reflecting members 35 and 37, as shown more clearly in Fig. 2. The pivot point for the pendulum should be as close as possible to the axis of rotation of the pendulum 24. The pendulum 32 should rotate in a plane including the axis of rotation of the first described pendulum and the center of gravity of the first described pendulum or as close thereto as possible. Affixed to the bottom of horizontal member 27 of pivot arm 23 is a light reflective surface 29, the function of which, along with that of light reflective surfaces 35 and 37, will be described below.

Also affixed to the shell of the sonde below the apparatus aforedescribed is a compass 77. The compass is secured to the shell by means of resilient support member 81 and 79 and set screws 83 and 85. The compass may have, in addition to its usual components, an indicating system comprising light reflective surfaces 87, 89 and 91 positioned so as to respectively indicate north, west, and east as shown in Fig. 3. If a light reflective surface is provided for indicating south, it should be blacked out as shown at 93 so as to be incapable of reflecting light. A scanning device such as described in the aforementioned Heintz et al. Patent No. 2,718,707 is provided both for the inclinometer and for the compass. The scanner for the inclinometer comprises a directive light source 57 for shining light upwardly as shown in a concentrated beam and a light sensitive detector 59 such as a photocell or phototransitor. A similar scanner including light source 75 and light detector 73 is provided for the compass. The scanners are driven by an electric motor 69 and are connected to shaft 67 by means of support plates 63a and 63b so as to rotate in a circular path about an axis that is the extension of the axis of rotation of the pendulous member 24.

With reference now to Fig. 2, certain details of the pendulous members are shown more perspicuously than in Fig. 1. As is shown, the pendulum 32 is free to swing over a limited arc defined by a stop 41 and weights 25. As may be seen in Figs. 4, 5 and 6, the reflecting surfaces 35 and 37 associated with pendulous member 32 are positioned so that the light from light source 57 will successively strike reflective member 29, member 35 and member 37. Member 37 is affixed to rod 31 by means of blacked out section 37a.

At this point it should be noted that the interior surface of bellows support 13, casing 5 and any of the surfaces of the members included therewithin that may reflect light other than light reflective surfaces 35, 37 and 29 should be blacked out to avoid the possibility of stray reflections finding their way to the light detector 59 other than from the light reflective surfaces 29, 35 and 37. The top plate 17, pivot arm 23, rod 31 and pendulous weights 25 and 39 may all be formed from a dull-surfaced metal such as brass. The light reflective members 29, 35 and 37 and the blacked out member 37a should have a low coefficient of thermal expansion; preferably, they are formed of Phosphor bronze and are chrome plated to form the light reflective surfaces. The damping fluid contained within the casing around the pendulous members may be any of the conventional oils used for this purpose in the past having a low change in viscosity with change in temperature.

Motor 69 that drives the scanner assemblies should have a rotational speed of 6 to 10 revolutions per minute and should have the best possible speed regulation with changes in applied voltage.

The operation of the embodiment of the invention described above will now be explained with reference to Figs. 4, 5 and 6. Fig. 4 shows the position of the reflecting surfaces of the pendulous member 32 for substantially zero inclination. Fig. 6 illustrates the position of the reflective surfaces for high magnitude of inclination and Fig. 5 for intermediate magnitude of inclination. It will be observed that the circular scanner path is such that in Fig. 4 the angle between a tangent to the scanner path at the point at which the path strikes the leading edge of reflecting surface 37 and the leading edge of reflecting surface 37 at that point (which may be called the angle of initial interception of the light beam by the light reflective surface) is of very low magnitude whereas the angle between the tangent to the circular path at the point at which it strikes the leading edge of reflecting surface 35 and the leading edge of reflecting surface 35 at that point is of high magnitude. Because of this, if the pendulum swings away from the axis of rotation of the pendulous member 24, there is effected a much larger change in the angle through which the scanner must rotate before striking the leading edge of reflecting surface 37 than is effected with respect to reflecting surface 35. However, this situation is reversed if the pendulum swings still further away from the axis of the pendulous member including pivot arm 23. For larger degrees of inclination there is only a small change in the angle of rotation before the circular path of the scanner strikes the leading edge of reflecting surface 37 whereas relatively large changes in the angle are produced for the same change in the inclination with respect to the leading edge of reflecting surface 35.

The operative relationship between the compass scanner 72 and the inclinometer scanner 56 will be readily evident upon an understanding of the wave form representations of the output signals thereof as depicted in Fig. 7. Manifestly, signals providing indications of the inclination of the instrument would be meaningless unless simultaneous information as to the absolute orientation of the casing is obtainable. In the past, generally this information has been derived by periodically photographing the face of a compass, but the apparatus shown in Fig. 1 is preferred since it provides a continuous flow of orientation information to a remote location such as the ground surface. If the compass scanner rotates, reflections from reflecting surfaces 91, 87 and 89 will produce useful signals from detector 73. The output signals obtained as a result of reflections from reflecting surfaces 91, 87 and 89, respectively, indicate that the scanner is pointing to east, north, and west. No output indication is obtained when the scanner is pointing south so that a reference is thereby obtained. An output signal representative of the output thereby obtainable from compass scanner 72 is depicted in the first line of Fig. 7.

As inclinometer scanner 56 rotates, it will periodically strike reflecting surface 29 which is pointing in the direction of inclination. Since inclinometer scanner 56 and compass scanner 72 are synchronized, the output signal obtained from inclinometer scanner 56 when reflections are received from reflecting surface 29 will provide, in conjunction with the output signals obtained from compass scanner 72, an indication of the absolute direction of inclination of the instrument. The pulse derived thereby may be of any desired width; the pulse is depicted as being of rather great width for purposes of ready identification.

As inclinometer scanner 56 rotates, cyclic signals will be derived therefrom as a result of successive reflections obtained from reflecting surfaces 29, 37 and 35, respectively. As the pendulum 32 swings away from the axis of the pendulum 24, the time interval between the pulse from reflecting surface 29 and that derived as a result of reflections from reflecting surface 35 will become shorter, whereas the time interval between the pulses from detector 59 as a result of reflections from reflecting surfaces 35 and 37 will become longer. This is graphically illustrated by the lower eight lines of Fig. 7. The pulse trains depicted are representative of actual pulse trains derived from an inclinometer built in accordance with the present invention. One pulse train is shown for every degree of inclination between 0° and 7°. The second line of Fig. 7 serves to illustrate the spacing between pulses produced as a result of reflections from reflecting surfaces 35 and 37. It can be seen that as the magnitude of inclination increases past 4° the accuracy of measurement of inclination obtained as a result of pulses from reflecting surface 35 increases considerably whereas the pulses obtained as a result of reflections from reflecting surface 37 will produce the greatest accuracy of measure from 0° to 4°, the accuracy rapidly diminishing for greater magnitudes of inclination.

A nomograph may be constructed on the basis of the pulse trains derived from a particular instrument which will be extremely useful in later measurements.

Output indications from inclinometer-scanner 56 and compass-scanner 72 may be presented at the surface by oscilloscope, by magnetically recording heads or by any other means well known to the art. The slip ring assemblies 65 and 71 have been found particularly adapted for bringing electrical energy to the component parts of the scanners and for tapping off information from the scanners to electrical leads running up the well to the ground surface.

The objects previously set forth are readily achieved by the present invention. The inclinometer has been found to give accurate, reliable service under the most adverse operating conditions. Maintenance problems have been virtually non-existent and no variations in output indications have been found traceable to variations in temperature as the instrument is lowered into wells. The instrument has been found to provide measurement accuracies to within one-tenth of a degree over the maximum range of inclinations encountered in oil field practice.

It is to be understood that the specific forms and apparatus illustrated in the drawings are by way of example only and that the invention is not restricted thereto but that variations thereof may be made by persons skilled in this particular art without departing from the scope of the invention.

What is claimed is:

1. An inclinometer including a body member supporting first and second bearing members; a first pendulous member pivotally supported between said bearing members including a member having a surface generally at right angles to the axis of rotation of said first pendulous member as defined by said bearing members; a second pendulous member supported by said first pendulous member on said axis and adapted to swing in planes normal to said surface and as nearly as possible including said axis; signal generating means including a source of directional radiation and radiation detecting means mounted to rotate about said axis as a center; first radiation reflecting means affixed to said first pendulous means to reflect radiation from said source to said detector over a narrow arc of movement of said source and said detector; second and third radiation reflecting means affixed to said second pendulous means to reflect radiation from said source to said detector over narrow arcs of movement of said source and detector, the angle of the arc of movement of said detector between reflections received from said first reflecting surface and either of said second and third reflecting surfaces being indicative of the angle of movement of said second pendulous means from said axis, said angle between reflections received from said first and second reflected means varying inversely to the angle between reflections received from said first and third reflective means as said second pendulous member moves from said axis.

2. An inclinometer comprising: a housing; first pendulous means pivotally supported between first and second bearing means; second pendulous means hingedly supported by said first pendulous means at third bearing means located on the axis of said first pendulous means defined by said first and second bearing means so as to be free to swing in planes including said axis and as nearly as possible passing through the center of gravity of said first pendulous means; first light reflective means on the first pendulous means; second and third light reflective means on the second pendulous means; a light source for emitting a beam of light; light detecting means; said light source and light detector means being mounted for rotation about said axis so that the light beam from said light source strikes said first, second and third light reflective means according to a given order of succession and the light detected thereby is detected by said light detector means; the angle of initial interception of said light beam by said second light reflective means varying most at angles greater than a given angle between said second pendulous means and said axis; the angle of initial interception of said light beam by said third reflective means varying most with change in angle between said second pendulous means and said axis at angles less than said given angle.

3. An inclinometer according to claim 2 wherein is included means for rotating said light source and said light detecting means about said axis as a center at a given constant angular speed.

4. An inclinometer including a body member supporting first and second bearing members; a first pendulous member pivotally supported between said bearing members including a member having a surface generally at right angles to the axis of rotation of said first pendulous member as defined by said bearing members; a second pendulous member supported by said first pendulous member on said axis and adapted to swing in planes normal to said surface and as nearly as possible including said axis; signal generating means including a source of directional radiation and radiation detecting means mounted to rotate about said axis as a center; first radiation reflecting means affixed to said first pendulous means to reflect radiation from said source to said detector over a narrow arc of movement of said source and said detector; second and third radiation reflecting means affixed to said second pendulous means to reflect radiation from said source to said detector over narrow arcs of movement of said source and detector; said second reflecting surface being shaped so that the angle between the leading edge thereof at the intersection between said leading edge and the circular path of said radiation, and the tangent to said circular path of said radiation at said intersection varies more at angles of inclination of said second pendulous means greater than a given angle than at angles of inclination less than a given angle; said third reflecting surface being shaped so that the angle between the leading edge thereof at its intersection with said circular path of said radiation and the tangent to said circular path of said radiation at the intersection between said leading edge of said third reflecting means and said circular path varies more at angles of inclination of said second pendulous means less than said given angle than at angles of intersection greater than said given angle.

5. An inclinometer including a body member supporting first and second bearing members; a first pendulous member pivotably supported between said bearing members and including a member having a surface generally at right angles to the axis of rotation of said first pendulous member as defined by said bearing members; a second pendulous member supported by said first pendulous member on said axis and adapted to swing in planes normal to said surface and as nearly as possible including said axis; signal generating means including a source of directional radiation and radiation detecting means mounted to rotate about said axis as a center; first radiation reflecting means affixed to said first pendulous means to reflect radiation from said source to said detector over a narrow arc of movement of said source and said detector; second and third radiation reflecting means affixed to said second pendulous means to reflect radiation from said source to said detector over narrow arcs of movement of said source and detector; said second reflecting means being formed so that the angle through which said light detector rotates between the points at which light is reflected from said first light reflective means and from said second light reflective means caries more for large angles than for small angles of inclination of said second pendulous means from said axis; said third light reflective means being formed so that the angle through which said light detector rotates between the points at which light is reflected from said first light reflective means and from said third light reflective means varies more for small angles than for large angles of inclination of said second pendulous means from said axis.

References Cited in the file of this patent
UNITED STATES PATENTS

| | | |
|---|---|---|
| 2,116,120 | Malmgren | May 3, 1938 |
| 2,614,334 | Hildebrandt | Oct. 21, 1952 |
| 2,718,707 | Heintz | Sept. 27, 1955 |